United States Patent
Kato et al.

(10) Patent No.: US 11,338,599 B2
(45) Date of Patent: May 24, 2022

(54) MOVING BODY SUPPORT APPARATUS AND PRINTING APPARATUS

(71) Applicant: SEIKO EPSON CORPORATION, Tokyo (JP)

(72) Inventors: Kazuhisa Kato, Matsumoto (JP); Keiichi Yato, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 558 days.

(21) Appl. No.: 15/847,422

(22) Filed: Dec. 19, 2017

(65) Prior Publication Data

US 2018/0178565 A1    Jun. 28, 2018

(30) Foreign Application Priority Data

Dec. 27, 2016   (JP) .............................. JP2016-254247

(51) Int. Cl.
*B41J 25/308*    (2006.01)
*H04N 1/31*    (2006.01)

(52) U.S. Cl.
CPC ....... *B41J 25/3088* (2013.01); *B41J 25/3082* (2013.01); *H04N 1/31* (2013.01)

(58) Field of Classification Search
CPC ...... B41J 25/3082; B41J 25/3088; H04N 1/31
See application file for complete search history.

(56) References Cited

U.S. PATENT DOCUMENTS

| | | | | |
|---|---|---|---|---|
| 5,000,590 A | * | 3/1991 | Einem | B41J 25/308 400/355 |
| 5,088,842 A | * | 2/1992 | Ito | B41J 11/20 400/59 |
| 5,257,867 A | * | 11/1993 | Ito | B41J 25/3088 400/56 |
| 6,497,466 B1 | * | 12/2002 | Writt | B41J 25/308 347/8 |
| 6,736,557 B2 | * | 5/2004 | DeVore | B41J 25/3088 400/354 |
| 9,403,390 B2 | * | 8/2016 | Saiga | B41J 25/3086 |
| 2003/0048315 A1 | | 3/2003 | Hiramoto | |
| 2013/0258329 A1 | * | 10/2013 | Higuchi | G01N 21/8806 356/237.4 |
| 2015/0210094 A1 | * | 7/2015 | Komiya | B41J 11/20 347/104 |

FOREIGN PATENT DOCUMENTS

| | | |
|---|---|---|
| JP | 2001-225521 | 8/2001 |
| JP | 2003-080691 | 3/2003 |
| JP | 2014-195983 | 10/2014 |
| JP | 2016-124232 | 7/2016 |

* cited by examiner

*Primary Examiner* — Matthew G Marini
*Assistant Examiner* — Marissa Ferguson-Samreth
(74) *Attorney, Agent, or Firm* — Workman Nydegger

(57) ABSTRACT

A moving body support apparatus including a main shaft, a sub-shaft that is arranged to be spaced from the main shaft, and a carriage that moves along the main shaft while causing a contact surface to be in contact with the sub-shaft is provided. A distance between the main shaft and the sub-shaft changes along a moving direction of the moving body. A printing apparatus including the moving body support apparatus is also provided.

12 Claims, 9 Drawing Sheets

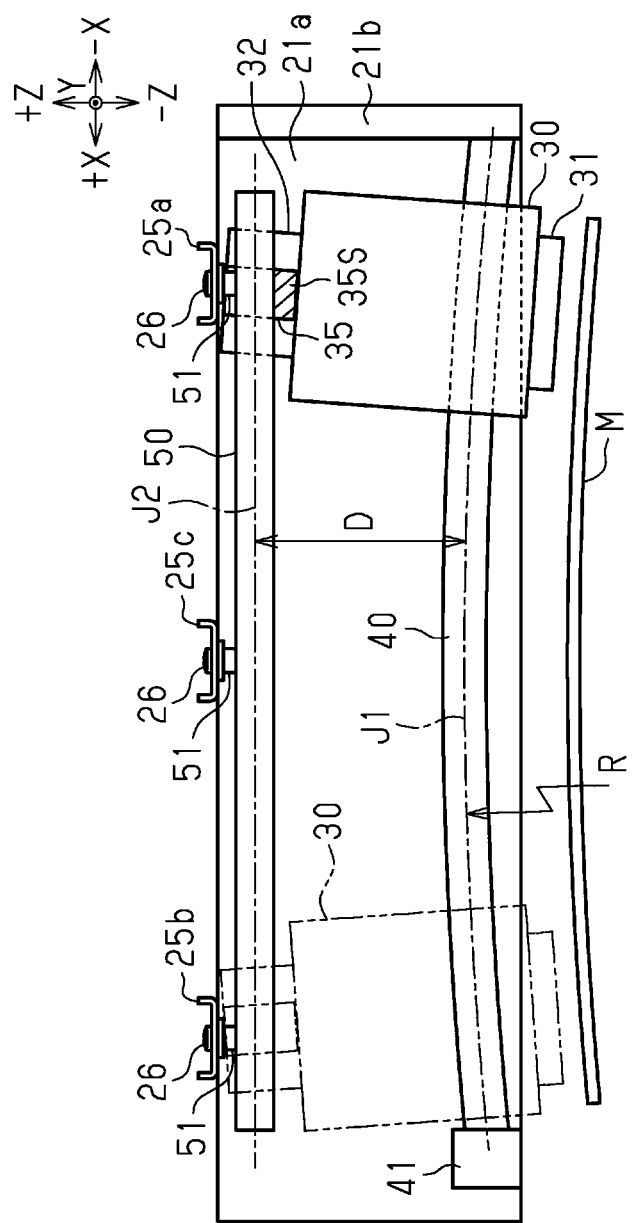

MOVING BODY SUPPORT APPARATUS AND PRINTING APPARATUS

BACKGROUND

1. Technical Field

The present invention relates to a moving body support apparatus and a printing apparatus including the moving body support apparatus.

2. Related Art

There is a printing apparatus that prints images such as characters and graphics on a medium such as a paper sheet by ejecting liquid to the medium from a printing unit included in a reciprocating moving body. Such a printing apparatus is provided with a moving body support apparatus that stably reciprocates a carriage, which is an example of a moving body provided with a printing unit, in a predetermined direction while supporting the carriage.

As such a moving body support apparatus, there is an apparatus that moves (slides) a carriage, which is provided with a liquid ejecting head that is an example of a printing apparatus, in a scanning direction (a moving direction) by slidably supporting the carriage by two shafts, that is, a main shaft and a sub-shaft (for example, JP-A-2016-124232).

By the way, the moving body support apparatus has a configuration in which a carriage is supported by a sliding portion in which a main shaft is inserted and a sliding portion which is in contact with (abuts on) a sub-shaft when reciprocating in the scanning direction. Therefore, during printing, the carriage moves in a pressed state in which pressure is applied to each sliding portion due to weight (deadweight) of the carriage and the like. Therefore, the moving body support apparatus has a configuration in which lubricant is supplied to an outer circumferential surface of each shaft in order to suppress abrasion occurring in an area where each shaft and the sliding portion are in contact with each other.

However, for example, when a lot of printing is performed in a printing apparatus, such as when a large number of paper sheets are printed, the number of reciprocating movements of the carriage increases. In this case, in particular, in the sliding portion of the carriage that is in contact with (abuts on) the sub-shaft in the pressed state, a contract region that is in contact with the sub-shaft when the carriage reciprocates in the scanning direction is only a part of the sliding portion, so that the probability of generating abrasion in the contact region of the sliding portion increases. As a result, there is a problem that durability of the carriage is deteriorated due to the ablation occurring in the sliding portion of the carriage.

SUMMARY

Such a problem generally occurs in common in the moving body support apparatus that supports the moving body by the main shaft and the sub-shaft.

An advantage of some aspects of the invention is to provide a moving body support apparatus excellent in durability and a printing apparatus including the moving body support apparatus.

Hereinafter, means for solving the problem and effects thereof will be described.

The moving body support apparatus includes a main shaft, a sub-shaft that is arranged to be spaced from the main shaft, and a moving body that moves along the main shaft while causing a contact surface to be in contact with the sub-shaft. A distance between the main shaft and the sub-shaft changes along a moving direction of the moving body.

According to this configuration, the moving body moves in parallel by being supported by the main shaft and the sub-shaft, and a contract region in the contact surface where the moving body is in contact with the sub-shaft changes in accordance with movement of the moving body that moves along the moving direction, so that abrasion of the contact surface is suppressed. Therefore, it is possible to obtain the moving body support apparatus excellent in durability.

In the moving body support apparatus described above, it is preferable that the distance between the main shaft and the sub-shaft continuously increases and/or continuously decreases along the moving direction.

According to this configuration, a contract region in the contact surface where the sub-shaft is in contact with the moving body continuously changes in accordance with movement of the moving body that moves along the moving direction, so that abrasion of the contact surface is evenly suppressed.

In the moving body support apparatus described above, it is preferable that the distance between the main shaft and the sub-shaft changes at a constant rate along the moving direction.

According to this configuration, the contract region in the contact surface where the sub-shaft is in contact with the moving body changes in proportion to a moving amount of the moving body when the moving body moves, so that the abrasion of the contact surface is more evenly suppressed.

In the moving body support apparatus described above, it is preferable that the moving body has a longest moving range and a shortest moving range in the moving direction and the distance between the main shaft and the sub-shaft becomes maximum or minimum in the shortest moving range of the moving body.

According to this configuration, change of the contract region in the contact surface where the sub-shaft is in contact with the moving body when printing is performed on a medium (paper sheet) of minimum size can be the same as that of when printing is performed on a medium (paper sheet) of maximum size, so that it is possible to obtain the moving body support apparatus excellent in durability.

In the moving body support apparatus described above, it is preferable that in a forward movement and a backward movement of the moving body, the distance between the main shaft and the sub-shaft changes in the same manner along the moving direction.

According to this configuration, change of the contract region in the contact surface where the sub-shaft is in contact with the moving body when the moving body moves is the same between the forward movement and the backward movement of the moving body that moves along the moving direction, so that abrasion of the contact surface that is in contact with the sub-shaft in the moving body is suppressed.

In the moving body support apparatus described above, it is preferable that the sub-shaft is provided so that the sub-shaft can move while maintaining a state in which a shaft line of the sub-shaft is in parallel with the contact surface of the moving body.

According to this configuration, it is possible to change the contact region with the sub-shaft on the contact surface of the moving body by moving the shaft line of the sub-shaft in parallel along the contact surface of the moving body. Therefore, it is possible to obtain the moving body support apparatus excellent in durability.

The printing apparatus includes the moving body support apparatus described above and a printing unit that is included in the moving body and performs printing on a medium by ejecting liquid to the medium.

According to this configuration, abrasion of the contact surface that is in contact with the sub-shaft in the moving body including the printing unit is suppressed, so that it is possible to obtain the printing apparatus excellent in durability.

BRIEF DESCRIPTION OF THE DRAWINGS

The invention will be described with reference to the accompanying drawings, wherein like numbers reference like elements.

FIG. 13 is a front view of a moving body support apparatus including a main shaft whose shaft line is a curved line.

DESCRIPTION OF EXEMPLARY EMBODIMENTS

Hereinafter, an embodiment of the printing apparatus including a moving body support apparatus will be described with reference to the drawings.

Figure 1:
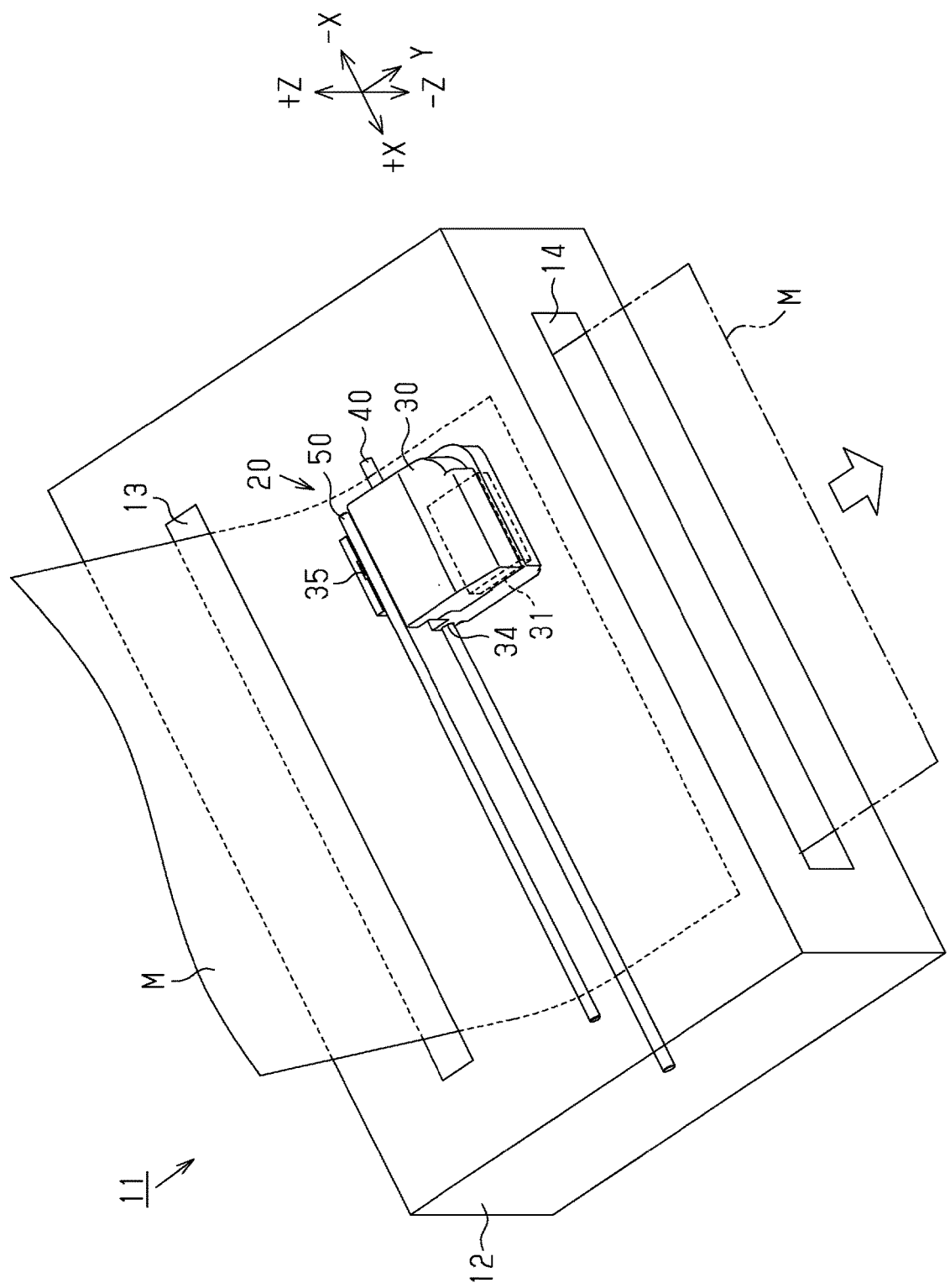
FIG. 1 is a perspective view showing a printing apparatus of an embodiment.

As shown in FIG. 1, the printing apparatus 11 includes a housing 12 having an approximately rectangular parallelepiped shape and further includes a carriage 30 as a moving body and a moving body support apparatus 20 that supports the carriage 30 in a reciprocally movable manner in the housing 12. The carriage 30 is provided with a liquid ejecting head 31 as a printing unit that performs printing on a medium M transported while facing the carriage 30. In FIG. 1, a configuration of the carriage 30 and a part of the moving body support apparatus 20 is shown in a perspective state.

In the present embodiment, in each drawing to be referred to including FIG. 1, a width direction of the printing apparatus 11, which is a moving direction of the carriage 30, is defined as a "left-right direction X", a depth direction of the printing apparatus 11, which is a transport direction in which the medium M is transported while facing the liquid ejecting head 31, is defined as a "front direction Y", and a height direction of the printing apparatus 11, which is a vertical direction, is defined as an "upper-lower direction Z". The left-right direction X, the front direction Y, and the upper-lower direction Z are directions perpendicular to one another. In the drawings to be referred to, of the left-right direction X, a left direction viewed from the front direction Y is referred to as "+X" and a right direction viewed from the front direction Y is referred to as "−X" as needed. Of the upper-lower direction Z, the upper direction which is an antigravity direction is referred to as "+Z" and the lower direction which is a gravity direction is referred to as "−Z".

In the printing apparatus 11 of the present embodiment, the medium M of a predetermined size such as A4 size is supplied into the housing 12 from a medium supply c 13 provided on the upper direction +Z side of the housing 12. Then, the supplied medium M is passed through the lower direction −Z side of the carriage 30 by a medium transport apparatus not shown in the drawings. When the medium M passes through the −Z side, liquid such as ink is ejected from the liquid ejecting head 31 provided in the carriage 30, which is supported by the moving body support apparatus 20 and moves reciprocally, to the medium M, so that images such as characters and graphics are printed on the medium M. As indicated by a void arrow in FIG. 1, the printed medium M is discharged to the outside of the housing 12 from a medium discharge port 14 provided on the front direction Y side which is a front side of the housing 12.

The moving body support apparatus 20 includes a main shaft 40 which is a round bar (or a round pipe) having a circular cross section and whose shaft line extends along the left-right direction X and a sub-shaft 50 which is also a round bar (or a round pipe) having a circular cross section located on the upper direction +Z side of the main shaft 40 and whose shaft line extends along the left-right direction X. Regarding the carriage 30, the main shaft 40 is inserted into a shaft receiving portion 34 provided in a part of the carriage 30 and the carriage 30 is supported along the inserted main shaft 40 in a reciprocally movable manner. Further, a pad 35 attached to a part of the carriage 30 comes into contact with the sub-shaft 50, so that the carriage 30 is supported by the sub-shaft 50 when the carriage 30 reciprocates along the main shaft.

Next, a configuration of the moving body support apparatus 20 will be described in detail.

Figure 2:
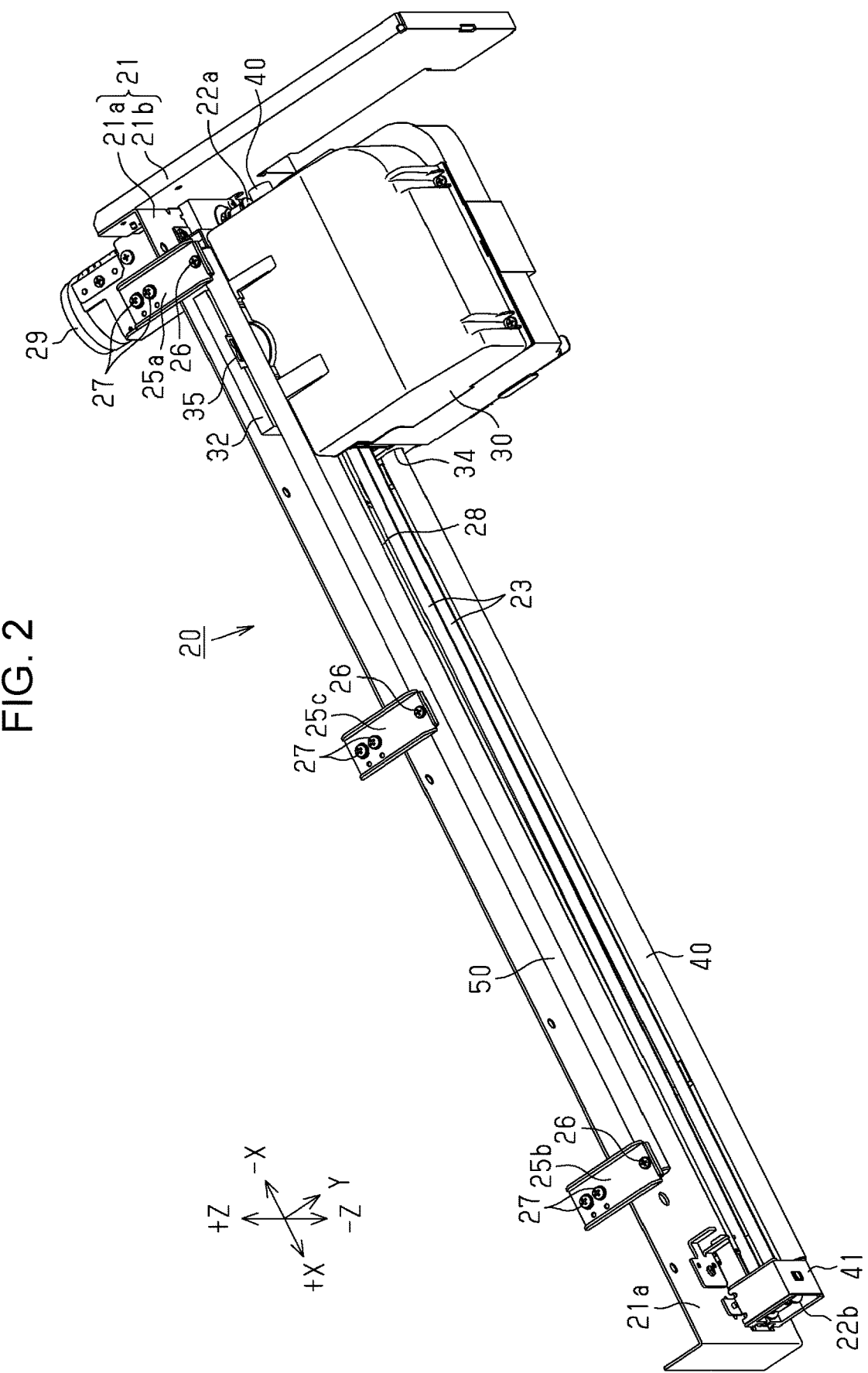
FIG. 2 is a perspective view showing a moving body support apparatus which supports a moving body and is included in the printing apparatus.
Figure 3:
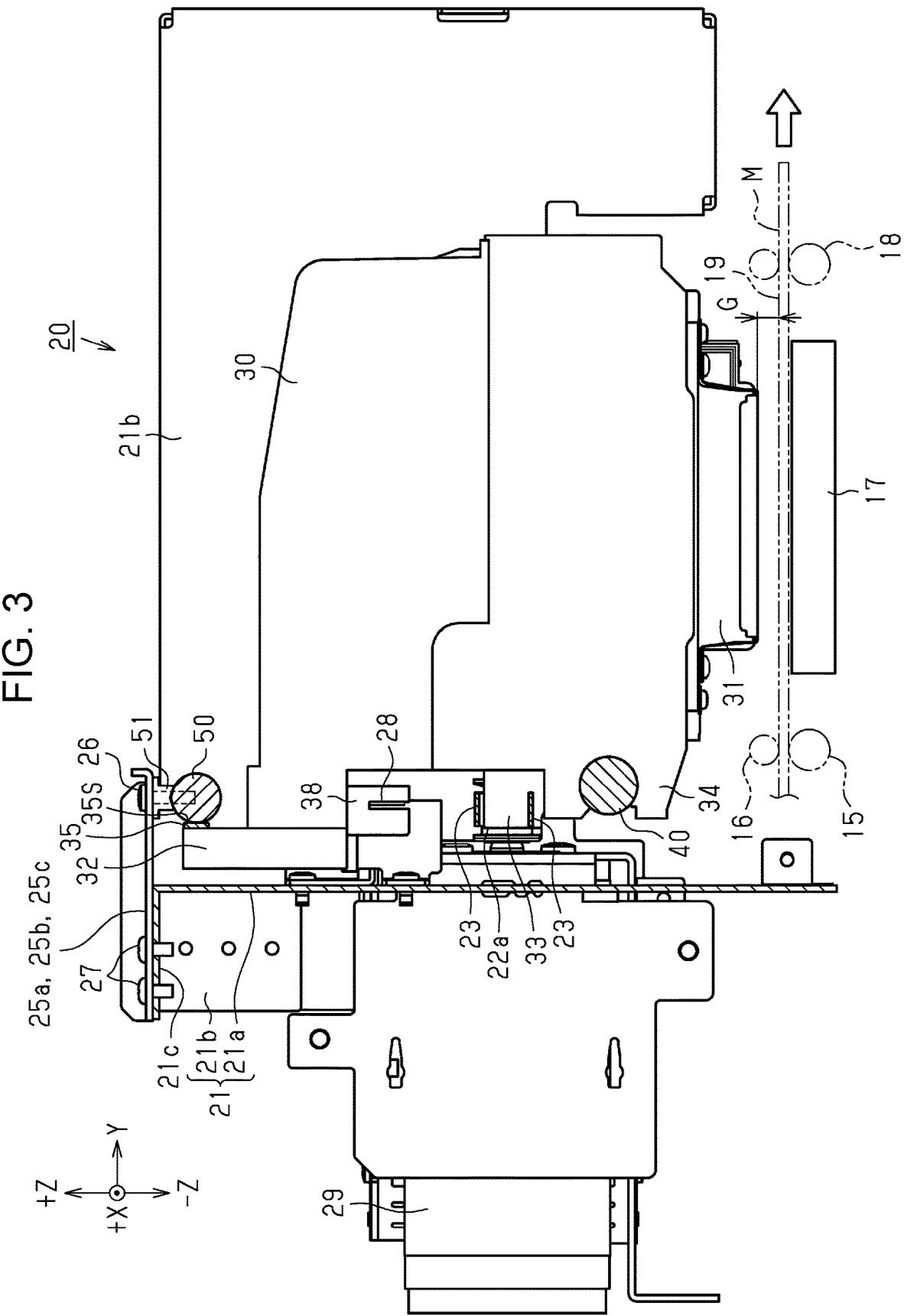
FIG. 3 is a side view showing a configuration of the moving body support apparatus by using a part of cross section.

As shown in FIGS. 2 and 3, in the moving body support apparatus 20, the main shaft 40 and the sub-shaft 50 are attached to a frame plate 21 having an L-shape when viewed from the upper direction +Z side. The flame plate 21 is formed by fastening together a main frame 21a whose main plate surface extends along both the upper-lower direction Z and the left-right direction X and a sub-frame 21b whose main plate surface extends along both the upper-lower direction Z and the front direction Y with screws or the like.

A left shaft end portion of the main shaft 40 on the +X side in the left direction is fixed to a shaft fixing plate 41 that is attached to an end portion of the main frame 21a on the lower direction −Z side, and a right shaft end portion of the main shaft 40 on the −X side in the right direction is fixed to an end portion of the sub-frame 21b on the lower direction −Z side. On the other hand, in the carriage 30, the shaft receiving portion 34 into which the main shaft 40 is inserted and which comes into contact with around more than one half of the outer circumferential surface of the entire outer circumferential surface of the inserted main shaft 40 to support the main shaft 40 is provided. The shaft receiving portion 34 has a predetermined length in the left-right direction X. Therefore, the carriage 30 reciprocates between the left and right shaft end portions of the main shaft 40 while the shaft receiving portion 34 is in contact with the main shaft 40 in a large contact surface and is supported by the main shaft 40 and the contact surface functions as a sliding surface that slides along the main shaft 40. In short, the carriage 30 moves along the main shaft 40.

The sub-shaft 50 is fixed to the main frame 21a by using a holding plate 25a, a holding plate 25b, and a holding plate 25c at three positions, that is, a right shaft end portion of the sub-shaft 50 on the −X side in the right direction, a left shaft end portion of the sub-shaft 50 on the +X side in the left direction, and a shaft central portion which is an intermediate position between the right shaft end portion and the left shaft end portion in the left-right direction X, respectively. Specifically, each of the holding plates 25a, 25b, and 25c is a substantially rectangular flat plate that is reinforced by being bent at an end portion. Each of the holding plates 25a, 25b, and 25c is attached to a bent portion 21c that is bent at a right angle to the main plate surface of the main frame 21a with screws 27 at an end portion of the main frame 21a on the upper direction +Z side. Screw holes (not shown in the drawings) corresponding to fixing screws 26 are provided in the sub-shaft 50 and the sub-shaft 50 is fixed to the holding plates 25a, 25b, and 25c by the fixing screws 26 at near end portions of the holding plates 25a, 25b, and 25 on the front direction Y side with a holding member 51 in between.

On the other hand, on the carriage 30, a protrusion portion 32 that protrudes in the upper direction +Z in a flange-like shape from a rear end portion opposite to the front direction Y of the carriage 30 is formed so as to face the sub-shaft 50 from a position opposite to the front direction Y. The pad 35, which is an example of a contact portion that comes into contact with the sub-shaft 50, is attached to the protrusion portion 32. Therefore, a surface of the pad 35 that faces the sub-shaft 50 is a contact surface 35S that is in contact with the sub-shaft 50. The carriage 30 moves along the main shaft 40 while being supported by the sub-shaft 50 that is in contact with the contact surface 35S. In short, the carriage 30 moves along the main shaft 40 while causing the contact surface 35S to be in contact with the sub-shaft 50.

A drive pulley 22a that can be driven and rotated by a motor 29 is provided at a position near the right direction −X end in the main frame 21a. On the other hand, a driven pulley 22b is provided at a position near the left direction +X end in the main frame 21a. An endless timing belt 23 is wound around the both pulleys 22a and 22b. A part of the timing belt 23 is connected to a connection portion 33 provided at a rear portion opposite to the front direction Y of the carriage 30. Therefore, when the drive pulley 22a is driven and rotated by the motor 29, a drive force of the drive pulley 22a is transmitted to the connection portion 33 and the carriage 30 reciprocates in the left-right direction X while being supported by the main shaft 40 and the sub-shaft 50.

In the present embodiment, an encoder (linear encoder) for detecting a moving speed and a position of the carriage 30 that moves in the left-right direction X is provided. Specifically, while a scale plate 28 provided with a scale of equal intervals is attached to the main frame 21a, a detection unit 38 in which a light emitting unit and a light receiving unit are embedded so as to sandwich the scale plate 28 is provided to the carriage 30. A linear encoder is formed by the scale plate 28 and the detection unit 38, and the motor 29 is driven based on a detection result of the detection unit 38.

The liquid ejecting head 31 that performs printing by ejecting a plurality of colors (for example, four colors) of liquids to the medium M from nozzles not shown in the drawings is provided on a lower surface side, which is the lower direction −Z side, of the carriage 30, and the liquid ejecting head 31 reciprocates in the left-right direction X along with the movement of the carriage 30. On the other hand, a support table 17 having a rectangular parallelepiped shape long in the left-right direction X perpendicular to the front direction Y is arranged in a position on the lower direction −Z side of the liquid ejecting head 31. The support table 17 is a table that supports a lower surface of the medium M when the medium M is transported in the front direction Y during printing.

On a side opposite to the front direction Y side that is upstream of the transport direction with respect to the support table 17, transport rollers are provided which include a drive roller 15 that is driven and rotated and gives a transporting force to the medium M and a driven roller 16 that presses the medium M to the drive roller 15. On the front direction Y side that is downstream of the transport direction with respect to the support table 17, transport rollers are provided which include a drive roller 18 that is driven and rotated and gives a transporting force to the medium M and a driven roller 19 that presses the medium M to the drive roller 18. The medium M is transported in the front direction Y as indicated by a void arrow in FIG. 3 by rotation of the transport rollers while the medium M is facing the liquid ejecting head 31.

In the moving body support apparatus 20 of the present embodiment, the sub-shaft 50 that is in contact with the carriage 30 is fixed to the holding plates 25a, 25b, and 25c so that the carriage 30 is moved in the left-right direction X along the main shaft 40 in a state in which a gap G is maintained between the medium M that is transported in the front direction Y on the support table 17 and the liquid ejecting head 31. A fixing structure of the sub-shaft 50 will be described with reference to the drawings.

Figure 4:
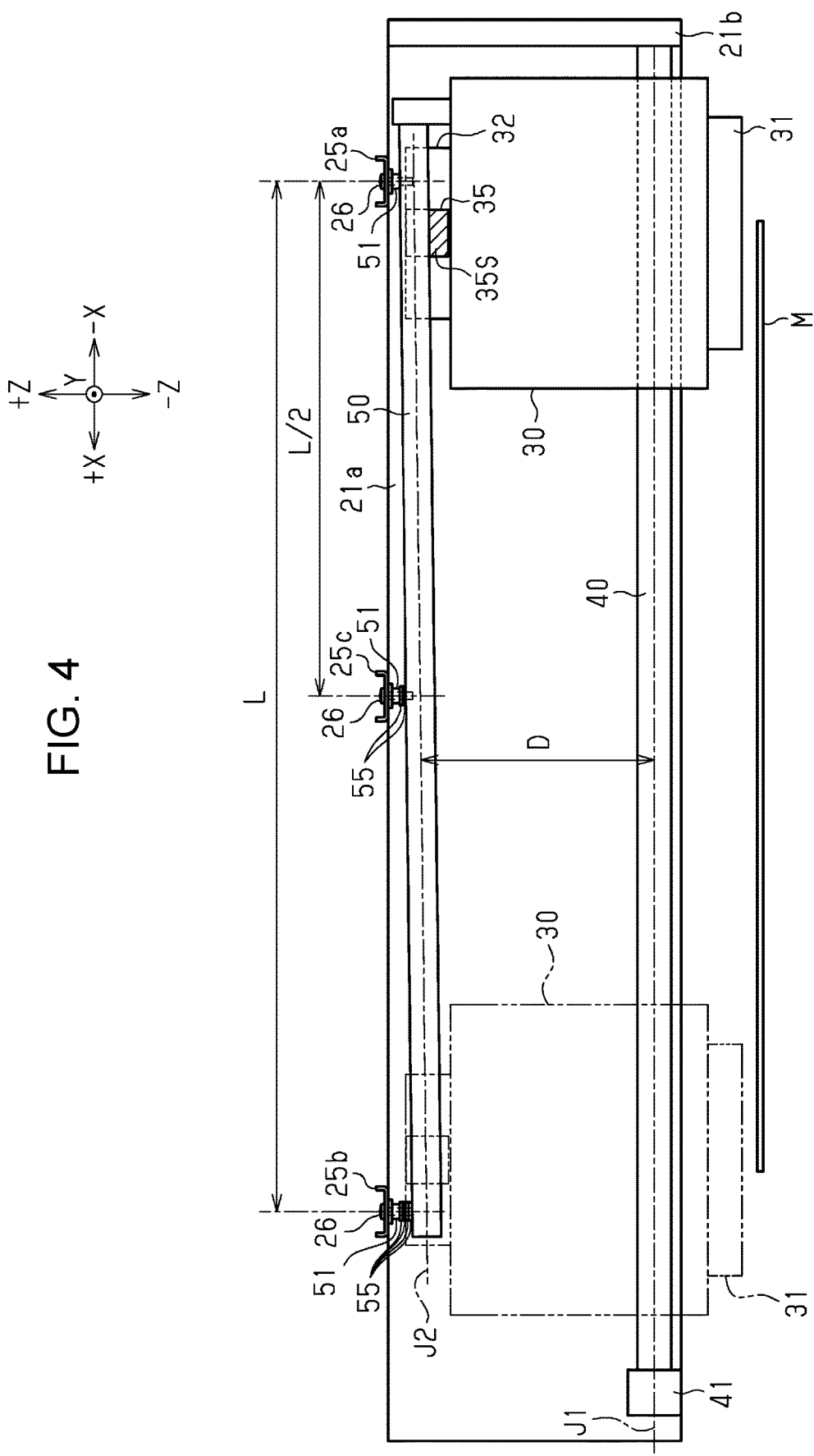
FIG. 4 is a front view of the moving body support apparatus schematically showing an arrangement of a main shaft and a sub-shaft that support the moving body.

As shown in FIG. 4, in the present embodiment, a length between a position where the sub-shaft 50 is fixed to the holding plate 25a (a position of the fixing screw 26) and a position where the sub-shaft 50 is fixed to the holding plate 25b (a position of the fixing screw 26) is a length L that is longer than a maximum moving range in the left-right direction X of the carriage 30 when printing is performed on the medium M whose length in the left-right direction X is the longest among the media M to be supplied. A position where the sub-shaft 50 is fixed to the holding plate 25c (a position of the fixing screw 26) is an intermediate position between the position where the sub-shaft 50 is fixed to the holding plate 25a and the position where the sub-shaft 50 is fixed to the holding plate 25b, that is, a position away from the position where the sub-shaft 50 is fixed to the holding plate 25a (the holding plate 26a) by a length L/2.

In the present embodiment, the sub-shaft 50 is fixed to the holding plates 25a, 25b, and 25c by fixing structures different from each other in these fixing positions. Specifically, the sub-shaft 50 is fixed to the holding plate 25a with the holding member 51 in between (see FIG. 3). On the other hand, the sub-shaft 50 is fixed to the holding plate 25b by the fixing screw 26 with four spacers 55 having a predetermined thickness in addition to the holding member 51 in between, and the sub-shaft 50 is fixed to the holding plate 25c by the fixing screw 26 with two spacers 55 having a predetermined thickness in addition to the holding member 51 in between.

Therefore, a shaft line J2 of the sub-shaft 50 that is fixed to the holding plates 25a, 25b, and 25c by the fixing screws 26 is one straight line, which extends in the left-right direction X when viewed in the upper-lower direction Z and extends in a left downward inclined direction with respect to the left-right direction X when viewed from the front direction Y, that is, a direction in which the left shaft end portion of the sub-shaft 50 is located below the right shaft end portion of the sub-shaft 50 by a predetermined distance in the lower direction −Z. By the way, in the present embodiment, the thickness of the spacer 55 is about 0.3 mm, and the shaft line J2 of the sub-shaft 50 is inclined with respect to the left-right direction X according to the number and the thickness of the spacers 55 in between. In FIG. 4, for ease of understanding of the description, the inclination of the sub-shaft 50 is exaggerated.

On the other hand, in the present embodiment, a shaft line J1 of the main shaft 40 is one straight line and extends in a direction in parallel with the left-right direction X. Therefore, when the extending direction of the shaft line J1 of the main shaft 40, which is the moving direction of the carriage 30, is defined as a first direction, and the extending direction of the shaft line J2 of the sub-shaft 50 is defined as a second direction, the second direction is a direction in which a distance D from the shaft line J1 of the main shaft 40 to the shaft line J2 of the sub-shaft 50, which is a distance between the main shaft 40 and the sub-shaft 50, decreases along the first direction in a moving range the carriage 30. In particular, in the present embodiment, the shaft line J2 of the sub-shaft 50 is one straight line, so that the second direction is a direction in which the distance D from the shaft line J1 of the main shaft 40 to the shaft line J2 of the sub-shaft 50 continuously decreases along the first direction in the moving range of the carriage 30. Further, the second direction is a direction in which the distance D from the shaft line J1 of the main shaft 40 to the shaft line J2 of the sub-shaft 50 changes (decreases) at a constant rate along the first direction, that is, a direction in which the distance D changes in proportion to a moving amount of the carriage 30. The distance D is a length along a direction perpendicular to the shaft line J1.

As shown by a hatched area in FIG. 4, the contact surface 35S in contact with the sub-shaft 50 is attached to a position on the protrusion portion 32, where the contact with the sub-shaft 50 is maintained while the carriage 30 moves in the maximum moving range (the length L) in the left-right direction X (the moving direction) of the carriage 30. In the present embodiment, a surface direction of the contact surface 35S of the pad 35 is a flat surface along the left-right direction X and the upper-lower direction Z. Therefore, the contact surface 35S of the pad 35 is in parallel with a surface (flat surface) along the left-right direction X in which the shaft line J2 of the sub-shaft 50 in contact with the contact surface 35S exists and the upper-lower direction Z. In other words, the shaft line J2 of the sub-shaft 50 exists within a surface in parallel with the contact surface 35S of the carriage 30.

Next, an operation of the moving body support apparatus 20 of the present embodiment will be described.

Figure 5:
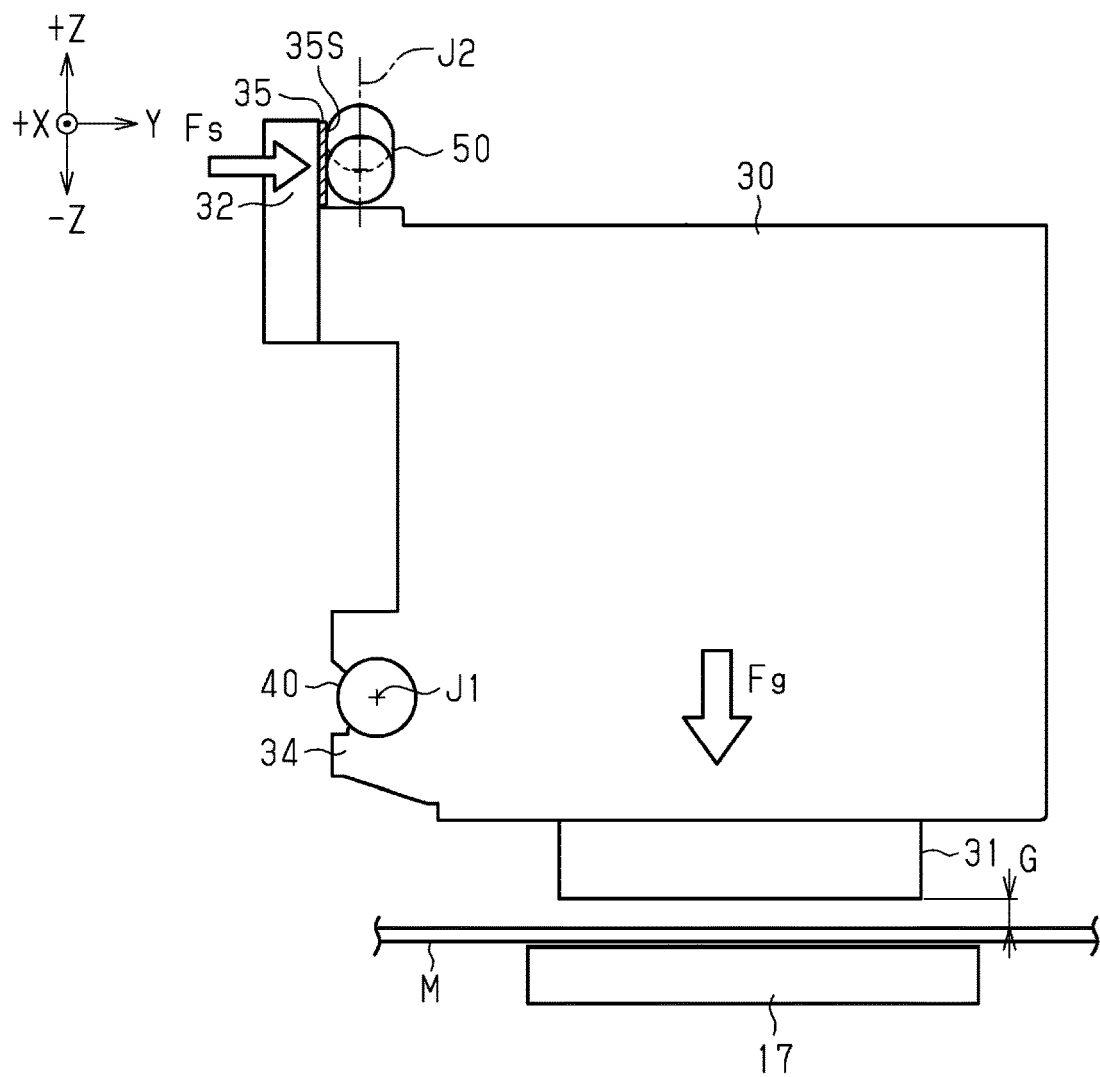
FIG. 5 is a side view schematically showing the moving body that moves while being supported by the main shaft and the sub-shaft.

As shown in FIG. 5, when printing is performed on the medium M, the carriage 30 moves (reciprocates) in the left-right direction X along the shaft line J1 of the main shaft 40. At this time, a rotational force around the main shaft 40 is applied to the carriage 30 by a force Fg in the lower direction −Z generated due to the deadweight of the carriage 30 and the like. By the rotational force around the main shaft 40, the contact surface 35S of the pad 35 comes into contact with the sub-shaft 50 in a pressed state in which the contact surface 35S is pressed against the sub-shaft 50 by a pressing force Fs. In FIG. 5, the carriage 30 is schematically shown.

In the present embodiment, the shaft line J2 of the sub-shaft 50 with which the contact surface 35S is in contact by the pressing force Fs exists within a surface in parallel with the contact surface 35S, so that the carriage 30 is supported by the main shaft 40 and the sub-shaft 50 and moves in parallel with the left-right direction X without being rotated around the main shaft 40. Therefore, the moving body support apparatus 20 reciprocates the carriage 30 in a state in which a change in the gap G between the medium M that is transported on the support table 17 and the liquid ejecting head 31 is suppressed. When the carriage 30 reciprocates, on the contact surface 35S of the pad 35 that comes into contact with the sub-shaft 50 by the pressing force Fs, a contract region that is in contact with the sub-shaft 50 changes continuously in the upper-lower direction Z and in proportional to the moving amount of the carriage 30.

Figure 6:
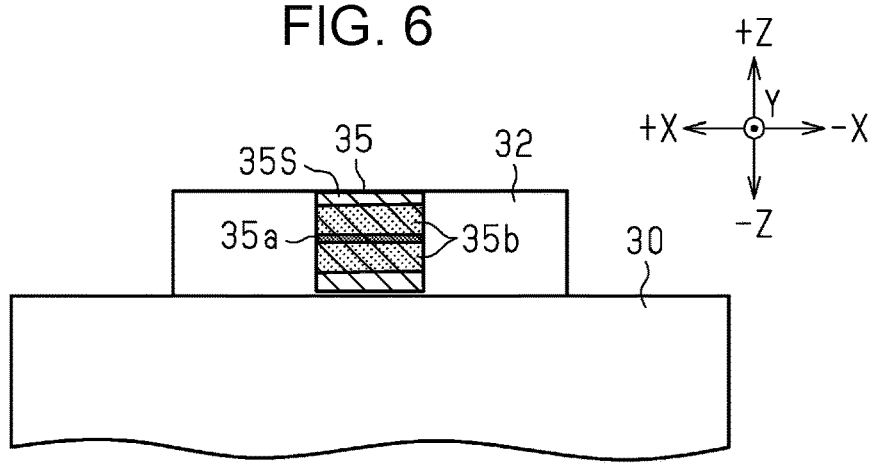
FIG. 6 is a partial front view of the moving body showing a contact surface of the moving body that is in contact with the sub-shaft.

Specifically, as shown in FIG. 6, in the case of the present embodiment in which the sub-shaft 50 is inclined with respect to the left-right direction X when viewed from the front direction Y, the contract region where the contact surface 35S is in contact with the sub-shaft 50 when the carriage 30 reciprocates is a contact region 35b having a predetermined width in the upper-lower direction Z as shown by a lightly shaded region in FIG. 6. As a result, the contact region that comes into contact with the sub-shaft 50 in the contact surface 35S is the contact region 35b having a large surface area, so that abrasion hardly occurs.

By the way, for example, in the case of a configuration in which the sub-shaft 50 is fixed to each of the holding plates 25a, 25b, and 25c by the fixing screw 26 with two spacers 55 in between, the shaft line J2 is not inclined with respect to the left-right direction X, but in parallel with the left-right direction X when viewed from the front direction Y. In this case, the contract region where the contact surface 35S is in contact with the sub-shaft 50 when the carriage 30 moves is a contact region 35a having an area smaller than that of the contact region 35b in the upper-lower direction Z as shown by a densely shaded region in FIG. 6. As a result, abrasion easily occurs on the contact region 35a of the contact surface 35S, which is in contact with the sub-shaft 50, as compared with on the contact region 35b.

A force (resultant force) in accordance with a reaction force of the pressing force Fs and the force Fg is applied to the main shaft 40. However, the shaft receiving portion 34 of the carriage 30 slides while a large contact surface of the shaft receiving portion 34 is in contact with the main shaft 40 when the carriage 30 reciprocates, so that occurrence of abrasion on the contact surface with the main shaft 40 is suppressed.

According to the moving body support apparatus 20 of the present embodiment, it is possible to obtain the following effects.

(1) The carriage 30 moves in parallel by being supported by the main shaft 40 and the sub-shaft 50 and a contract region where the carriage 30 is in contact with the sub-shaft 50 on the contact surface 35S changes in accordance with movement of the carriage 30 that moves along the first direction, so that abrasion of the contact surface 35S is suppressed. Therefore, it is possible to obtain the moving body support apparatus 20 excellent in durability.

(2) A contract region where the sub-shaft 50 is in contact with the carriage 30 on the contact surface 35S changes continuously in accordance with movement of the carriage 30 that moves along the first direction, so that abrasion of the contact surface 35S is evenly suppressed.

(3) The contract region where the sub-shaft 50 is in contact with the carriage 30 on the contact surface 35S changes in proportion to the moving amount of the carriage 30 when the carriage 30 moves, so that abrasion of the contact surface is suppressed more evenly in the moving body.

The embodiment described above may be changed as described below.

In the moving body support apparatus 20 of the embodiment described above, the second direction may be a direction in which the distance D from the shaft line J1 of the main shaft 40 to the shaft line J2 of the sub-shaft 50 (the distance between the main shaft 40 and the sub-shaft 50) continuously increases and/or continuously decreases along the first direction.

Specifically, the second direction may be a direction in which the distance D from the shaft line J1 of the main shaft 40 to the shaft line J2 of the sub-shaft 50 continuously increases along the first direction in the moving range of the carriage 30. For example, in FIG. 4, the sub-shaft 50 is fixed to the holding plate 25b by the fixing screw 26 with the holding member 51 in between. On the other hand, the sub-shaft 50 is fixed to the holding plate 25a by the fixing screw 26 with four spacers 55 having a predetermined thickness in addition to the holding member 51 in between. By the above configuration, the shaft line J2 of the sub-shaft 50 that is fixed to the holding plates 25a, 25b, and 25c by the fixing screws 26 is a straight line, which extends in the left-right direction X when viewed in the upper-lower direction Z and extends in a left upward inclined direction with respect to the left-right direction X, that is, a direction in which the left shaft end portion of the sub-shaft 50 is located above the right shaft end portion of the sub-shaft 50 by a predetermined distance in the upper direction +Z. Therefore, when the extending direction of the shaft line J1 of the main shaft 40 is defined as a first direction, and the extending direction of the shaft line J2 of the sub-shaft 50 is defined as a second direction, the second direction is a direction in which the distance D from the shaft line J1 of the main shaft 40 to the shaft line J2 of the sub-shaft 50 increases along the first direction in the moving range of the carriage 30.

Alternatively, the second direction may be a direction in which the distance D from the shaft line J1 of the main shaft 40 to the shaft line J2 of the sub-shaft 50 both continuously increases and continuously decreases along the first direction in the moving range of the carriage 30. This modified example will be described with reference to FIG. 7.

Figure 7:
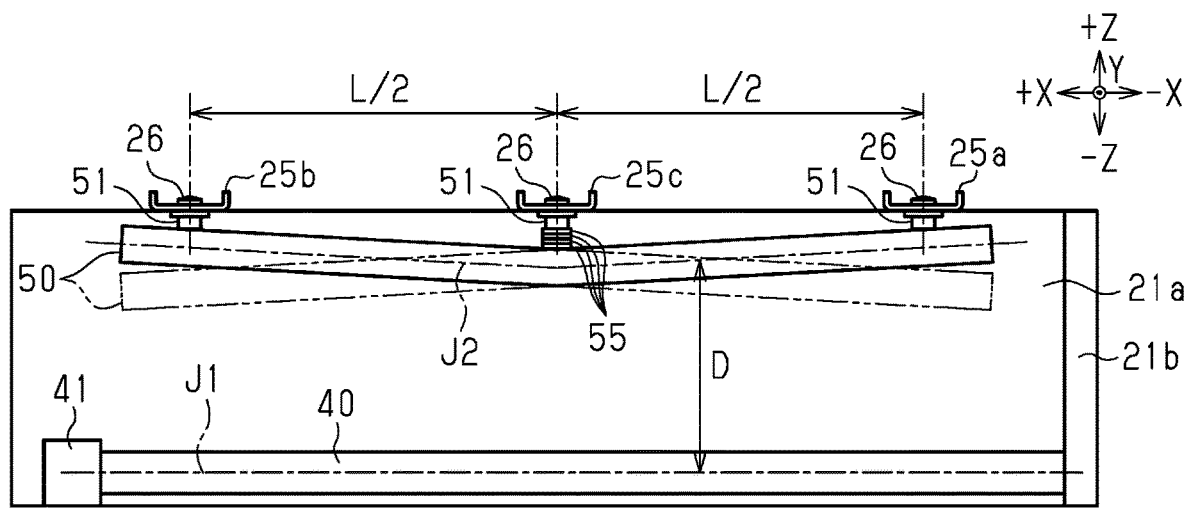
FIG. 7 is a front view of a moving body support apparatus including a sub-shaft having a shape different from that of the sub-shaft of the embodiment.

As shown in FIG. 7, in the present modified example, the shaft line J2 of the sub-shaft 50 is one straight line that extends in the left-right direction X when viewed in the upper-lower direction Z, and the shaft line J2 has a shape in which the shaft line J2 is bent at its central portion so as to be two straight lines which extend in two inclined directions different from each other with respect to the left-right direction X and which form a V shape bent at its central portion when viewed from the front direction Y. The sub-shaft 50 is fixed to each of the holding plates 25a and 25b by the fixing screw 26 with the holding member 51 in between. On the other hand, the sub-shaft 50 is fixed to the holding plate 25c by the fixing screw 26 with four spacers 55 having a predetermined thickness in addition to the holding member 51 in between.

By the above configuration, in the sub-shaft 50 that is fixed to the holding plates 25a, 25b, and 25c by the fixing screws 26, as shown by solid lines in FIG. 7, a shaft central portion of the sub-shaft 50 is located below right and left shaft end portions of the sub-shaft 50 by a predetermined distance in the lower direction −Z according to the spacers 55 in between. Therefore, when the extending direction of the shaft line J1 of the main shaft 40 is defined as a first direction, and the extending direction of the shaft line J2 of the sub-shaft 50 is defined as a second direction, the second direction is a direction in which the distance D from the shaft line J1 of the main shaft 40 to the shaft line J2 of the sub-shaft 50 decreases and increases along the first direction in the moving range of the carriage 30.

As shown by two-dot chain lines in FIG. 7, the sub-shaft 50 may be fixed to the holding plate 25c by the fixing screw 26 with the holding member 51 in between. In this case, the sub-shaft 50 is fixed to each of the holding plate 25a and the holding plate 25b by the fixing screw 26 with four spacers 55 having a predetermined thickness in addition to the holding member 51 in between. In the case of the above configuration, the second direction is a direction in which the distance D from the shaft line J1 of the main shaft 40 to the shaft line J2 of the sub-shaft 50 increases and decreases along the first direction in the moving range of the carriage 30.

Alternatively, although not shown in the drawings, the shaft line J2 of the sub-shaft 50 extends in the left-right direction X when viewed in the upper-lower direction Z, and the shaft line J2 may extend so as to form, for example, a W shape in which a plurality of V shapes that are bent at its central portion appear in a row in the left-right direction X when viewed from the front direction Y. In this case, the second direction is a direction in which the distance D from the shaft line J1 of the main shaft 40 to the shaft line J2 of the sub-shaft 50 repeatedly increases and decreases along the first direction in the moving range of the carriage 30.

In the moving body support apparatus 20 of the embodiment described above, the second direction in which the shaft line J2 of the sub-shaft 50 extends may be a direction in which the distance D from the shaft line J1 of the main shaft 40 to the shaft line J2 of the sub-shaft 50 changes along the first direction in the same manner when the carriage 30 moves forward and backward.

The present modified example can employ a configuration in which, for example, in the moving body support apparatus 20 having the configuration shown in FIG. 7, the carriage 30 not shown in FIG. 7 moves from the position where the sub-shaft 50 is fixed to the holding plate 25c to the −X side in the right direction and the +X side in the left direction along the left-right direction X by the same distance, respectively, during printing. In other words, when the carriage 30 moves (moves forward) from the −X side in the right direction to the +X side in the left direction and when the carriage 30 moves (moves backward) from the +X side in the left direction to the −X side in the right direction, the distance D from the shaft line J1 of the main shaft 40 to the shaft line J2 of the sub-shaft 50 changes along the left-right direction X (the first direction) in the same manner.

According to the present modified example, in addition to the effects (1) to (3) of the embodiment describe above, the following effects are obtained.

(4) Change of the contract region in the contact surface 35S where the sub-shaft 50 is in contact with the carriage 30 when the carriage 30 moves is the same between forward movement and backward movement of the carriage 30 that moves along the left-right direction X (the first direction), so that abrasion of the contact surface 35S that is in contact with the sub-shaft 50 in the carriage 30 is suppressed.

In the moving body support apparatus 20 of the embodiment described above, when the moving range of the carriage 30 has a longest moving range and a shortest moving range in the left-right direction X which is a moving direction of the carriage 30, the second direction may be a direction in which the distance D from the shaft line J1 of the main shaft 40 to the shaft line J2 of the sub-shaft 50 becomes maximum or minimum in the shortest moving range of the carriage 30.

For example, there is a case in which a medium M of a maximum size in the left-right direction X and a medium M of a minimum size in the left-right direction X are supplied to the printing apparatus 11 from the medium supply port 13 provided on the upper direction +Z side of the housing 12 and printing is performed on each medium M. In this case, the carriage 30 reciprocates in the longest moving range and the shortest moving range for the supplied medium M of the maximum size and the supplied medium of the minimum size, respectively.

When the carriage 30 reciprocates in the longest moving range and the shortest moving range in this way, for example, the sub-shaft 50 is bent like the shape shown by solid lines in FIG. 7 and the second direction of the shaft line J2 of the sub-shaft 50 may be a direction in which the distance D from the shaft line J1 of the main shaft 40 to the shaft line J2 of the sub-shaft 50 becomes the minimum in the shortest moving range of the carriage 30. Alternatively, the sub-shaft 50 is bent like the shape shown by two-dot chain lines in FIG. 7 and the second direction of the shaft line J2 of the sub-shaft 50 may be a direction in which the distance D from the shaft line J1 of the main shaft 40 to the shaft line J2 of the sub-shaft 50 becomes the maximum in the shortest moving range of the carriage 30.

The configuration shown in FIG. 7 can be employed in a case in which, for example, the medium M of the maximum size is an A4 paper sheet, the medium M of the minimum size is an A6 paper sheet whose short side length is a half of that of A4, and the medium M is supplied by aligning the left side of the paper sheet to the zero-digit side that is located on the −X side in the right direction in the medium supply port 13.

According to this modified example, in addition to the effects (1) to (3) of the embodiment describe above, the following effects are obtained.

(5) Change of the contract region in the contact surface 35S where the sub-shaft 50 is in contact with the carriage 30 when the printing is performed on the medium M (paper sheet) of the minimum size can be the same as that of when the printing is performed on the medium M (paper sheet) of the maximum size, so that it is possible to obtain the moving body support apparatus 20 excellent in durability.

In the moving body support apparatus 20 of the embodiment described above, the second direction in which the shaft line J2 of the sub-shaft 50 extends need not necessarily be a direction in which the distance D from the shaft line J1 of the main shaft 40 to the shaft line J2 of the sub-shaft 50 (the distance between the main shaft 40 and the sub-shaft 50) changes at a constant rate along the first direction (the left-right direction X). This modified example will be described with reference to FIG. 7.

Figure 8:
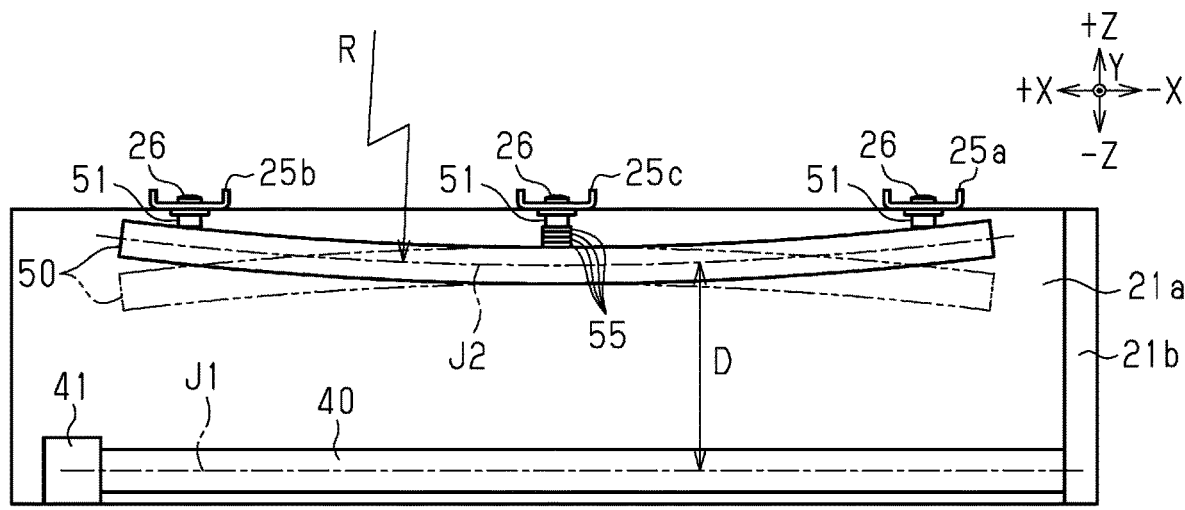
FIG. 8 is a front view of a moving body support apparatus including a sub-shaft having a shape different from that of the sub-shaft of the embodiment.

As shown in FIG. 8, in the present modified example, the sub-shaft 50 is a curved round bar (round pipe) having a circular arc shape, and the shaft line J2 of the sub-shaft 50 is not a straight line but a curved line with curvature radius R. The sub-shaft 50 is fixed to each of the holding plates 25a and 25b by the fixing screw 26 with the holding member 51 in between. On the other hand, the sub-shaft 50 is fixed to the holding plate 25c by the fixing screw 26 with four spacers 55 having a predetermined thickness in addition to the holding member 51 in between. By the above configuration, as shown by solid lines in FIG. 8, a shaft central portion of the sub-shaft 50 is located below right and left shaft end portions of the sub-shaft 50 by a predetermined distance in the lower direction −Z according to the spacers 55 in between. As a result, the shaft line J2 of the sub-shaft 50 extends in the left-right direction X when viewed in the upper-lower direction Z, and becomes a downward projecting curved line when viewed from the front direction Y. Therefore, the second direction is a direction in which the distance D from the shaft line J1 of the main shaft 40 to the shaft line J2 of the sub-shaft 50 changes along the first direction in the moving range of the carriage 30.

As shown by two-dot chain lines in FIG. 8, the sub-shaft 50 whose shaft line J2 is a curved line with curvature radius R may be an upward projecting curved line when viewed from the front direction Y. For example, the sub-shaft 50 may be fixed to the holding plate 25c by the fixing screw 26 with the holding member 51 in between. In this case, the sub-shaft 50 is fixed to each of the holding plate 25a and the holding plate 25b by the fixing screw 26 with four spacers 55 having a predetermined thickness in addition to the holding member 51 in between.

Alternatively, although description with reference to the drawings will be omitted here, the shaft line J2 of the sub-shaft 50 extends in the left-right direction X when viewed in the upper-lower direction Z, and the shaft line J2 may extend so as to form, for example, an S-shaped curved line where a circular arc-shaped curved line, in which projecting portions are reversed to each other in the upper-lower direction, continues in the left-right direction X when viewed from the front direction Y. In this case, the second direction is a direction in which the distance D from the shaft line J1 of the main shaft 40 to the shaft line J2 of the sub-shaft 50 repeatedly decreases and increases (increases and decreases) along the first direction in the moving range of the carriage 30.

In the moving body support apparatus 20 of the embodiment described above or the modified examples described above, the second direction in which the shaft line J2 of the sub-shaft 50 extends may be a direction in which the distance D from the shaft line J1 of the main shaft 40 to the shaft line J2 of the sub-shaft 50 changes along the first direction (the left-right direction X) in at least a part of the moving range of the carriage 30.

Figure 9:
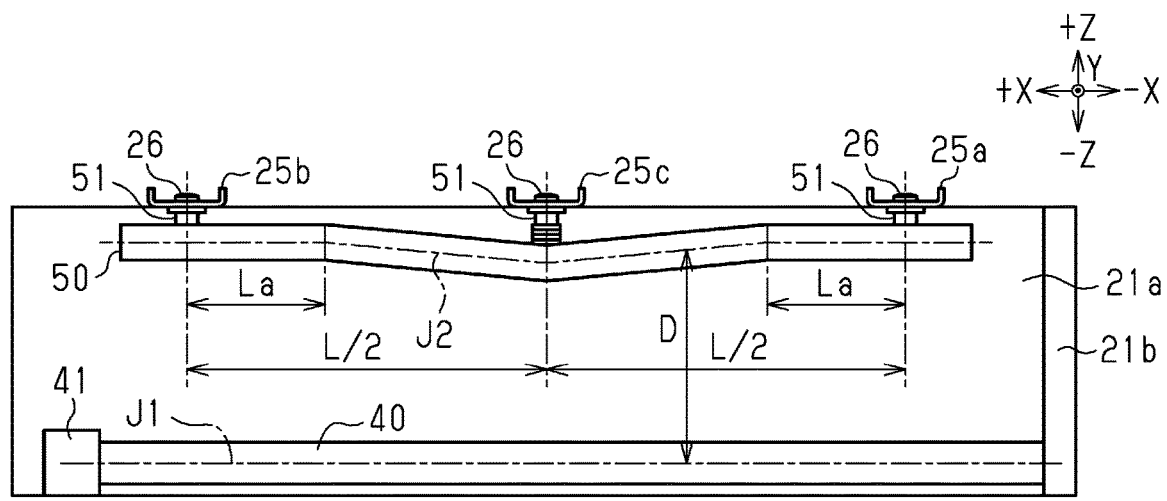
FIG. 9 is a front view of a moving body support apparatus including a sub-shaft having a shape different from that of the sub-shaft of the embodiment.

For example, as shown in FIG. 9, the sub-shaft 50 may have a shape bent at three positions so as to form a V shape at its central portion. Specifically, the sub-shaft 50 is fixed to each of the holding plates 25a and 25b by the fixing screw 26 with the holding member 51 in between. On the other hand, the sub-shaft 50 is fixed to the holding plate 25c by the fixing screw 26 with four spacers 55 having a predetermined thickness in addition to the holding member 51 in between. The shaft line J2 of the sub-shaft 50 is one straight line along the left-right direction X when viewed in the upper-lower direction Z. On the other hand, when viewed from the front direction Y, in the shaft line J2 of the sub-shaft 50, a portion from the right end to a position away from the holding plate 25a by a length La in the left direction +X and a portion from the left end to a position away from the holding plate 25b by a length La in the right direction −X are straight lines along the left-right direction X, and the other portions are two straight lines which extend in inclined directions different from each other with respect to the left-right direction X and which form a V shape.

Therefore, the second direction in which the shaft line J2 of the sub-shaft 50 extends is a direction in which the distance D from the shaft line J1 of the main shaft 40 to the shaft line J2 of the sub-shaft 50 changes along the first direction in a part of the moving range of the carriage 30. As a result, in the part of the moving range of the carriage 30, a contact region that is in contact with the sub-shaft 50 on the contact surface 35S changes, so that abrasion of the contact surface 35S is suppressed and it is possible to obtain the moving body support apparatus 20 excellent in durability.

In the moving body support apparatus 20 of the embodiment described above, the sub-shaft 50 may be movably provided while maintaining a state in which the shaft line J2 of the sub-shaft 50 is in parallel with the contact surface 35S of the carriage 30. This modified example will be described with reference to the drawings.

Figure 10:
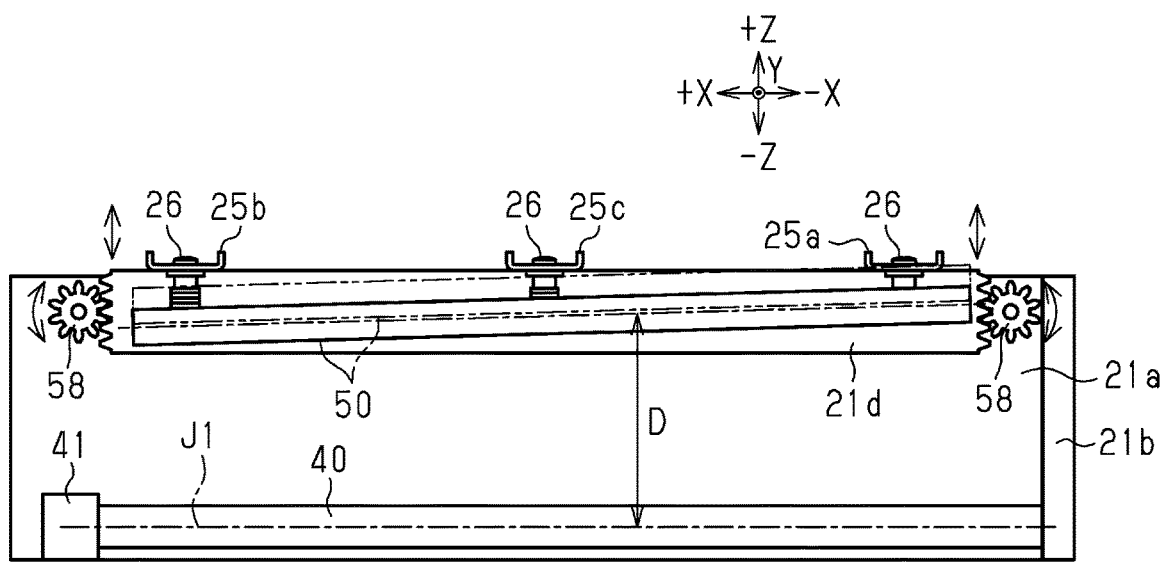
FIG. 10 is a front view schematically showing a configuration of a moving body support apparatus that can move while maintaining a state in which a shaft line of the sub-shaft is in parallel with the contact surface.

As shown in FIG. 10, in the present modified example, on the flame plate 21 of the above embodiment shown in FIG. 4, a substantially rectangular slide frame 21d whose longitudinal direction is the left-right direction X is movably provided along a main plate surface of the main frame 21a while maintaining a state in parallel with the upper-lower direction Z. A rack is provided to both side ends in the left-right direction X of the side frame 21d. Pinions 58 respectively engaged with the racks are rotatably attached to the main frame 21a. The pinions 58 can be rotated by a motor not shown in the drawings.

In the present modified example, the holding plates 25a, 25b, and 25c that fix the sub-shaft 50 are fixed to the slide frame 21d. Therefore, when the slide frame 21d is moved in the upper-lower direction Z by rotation (forward/reverse rotation) of the pinions 28, the sub-shaft 50 moves in parallel along the upper-lower direction Z between a position shown by solid lines in FIG. 10 and a position shown by two-dot chain lines in FIG. 10. Therefore, the shaft line J2 of the sub-shaft 50 that is fixed to the holding plates 25a, 25b, and 25c is moved in parallel along the contact surface 35S of the carriage 30 (the pad 35) by drive of the motor.

Figure 11:
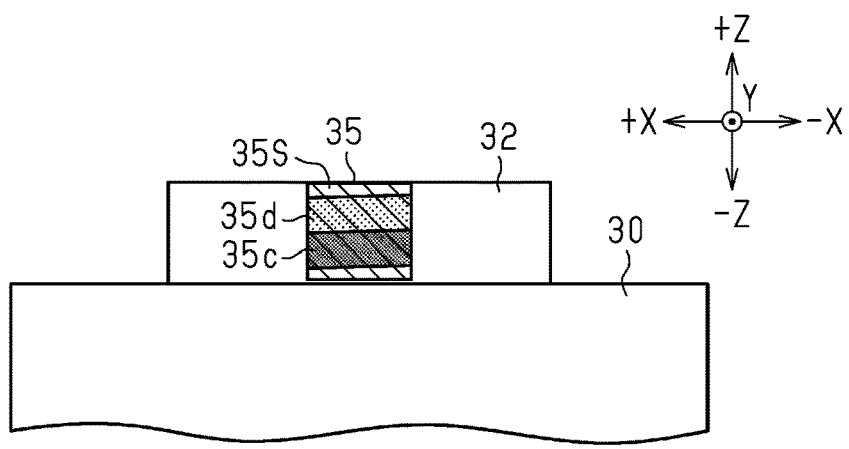
FIG. 11 is a partial front view of a moving body showing a contact surface of the moving body that is in contact with the sub-shaft that moves in parallel.

As shown in FIG. 11, according to the present modified example, on the contact surface 35S of the pad 35 that comes into contact with the sub-shaft 50, a contract region that is in contact with the sub-shaft 50 changes in accordance with movement (parallel movement) of the sub-shaft 50 in the upper-lower direction Z. For example, when the sub-shaft 50 is located at a position shown by solid lines in FIG. 10, the contract region where the contact surface 35S is in contact with the sub-shaft 50 when the carriage 30 moves is a contact region 35c shown by a densely shaded region in FIG. 11. On the other hand, when the sub-shaft 50 moves to a position shown by two-dot chain lines in FIG. 10, the contract region where the contact surface 35S is in contact with the sub-shaft 50 when the carriage 30 moves is a contact region 35d shown by a lightly shaded region in FIG. 11. As a result, the contract region where the contact surface 35S is in contact with the sub-shaft 50 changes, so that abrasion hardly occurs on the contact surface 35S.

According to the present modified example, in addition to the effects (1) to (3) of the embodiment describe above, the following effects are obtained.

(6) It is possible to change the contact region with the sub-shaft 50 on the contact surface 35S of the carriage 30 by moving the shaft line J2 of the sub-shaft 50 in parallel along the contact surface 35S of the carriage 30. Therefore, it is possible to obtain the moving body support apparatus 20 excellent in durability.

In the moving body support apparatus 20 of the embodiment described above, regarding a surface direction, the contact surface 35S of the pad 35 need not necessarily be a surface along the left-right direction X and the upper-lower direction Z. This modified example will be described with reference to FIG. 12.

Figure 12:
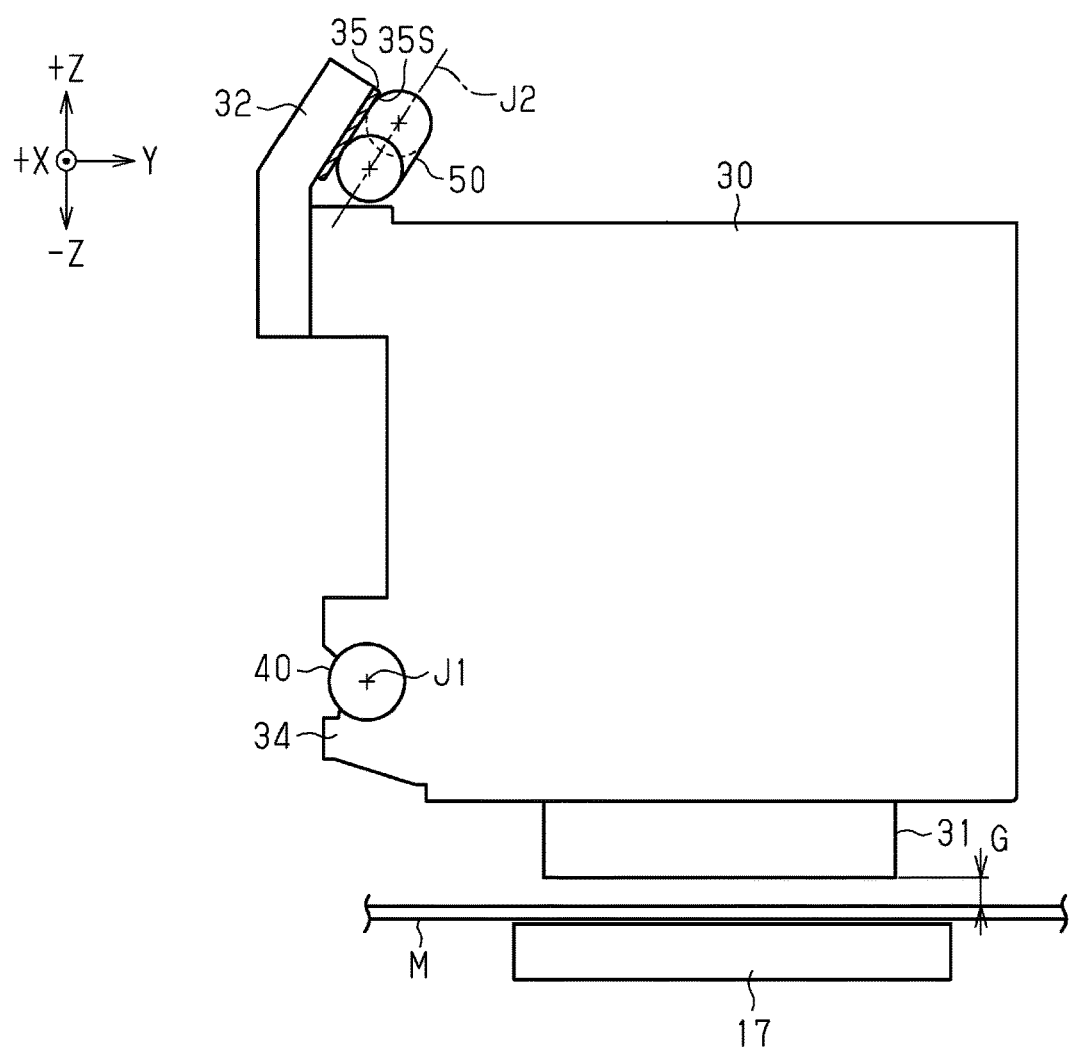
FIG. 12 is a side view of a moving body support apparatus schematically showing a moving body where a sub-shaft is in contact with an inclined contact surface.

As shown in FIG. 12, in the present modified example, in the carriage 30, a protrusion portion 32 that protrudes in the upper direction +Z in a flange-like shape from a rear end portion opposite to the front direction Y of the carriage 30 is formed in an inclined shape where a protruding end of the protrusion portion 32 in the upper direction +Z of the upper-lower direction Z is located in the front direction Y. Therefore, in the pad 35 attached to a surface, which faces the sub-shaft 50, of the protrusion portion 32 having an inclined shape, the contact surface 35S that faces the sub-shaft 50 and comes into contact with the sub-shaft 50 is an inclined surface that extends in both an inclined direction inclined with respect to the upper-lower direction Z and the left-right direction X.

Therefore, when the contact surface 35S is an inclined surface inclined with respect to the upper-lower direction Z in this way, the sub-shaft 50 is fixed to the flame plate 21 (the main frame 21a) so that the shaft line J2 of the sub-shaft 50 in contact with the contact surface 35S exists within a surface in parallel with the contact surface 35S of the carriage 30 as shown in FIG. 12. The sub-shaft 50 is fixed in this way, so that the carriage 30 moves in parallel with the left-right direction X along the main shaft 40 while being in contact with the sub-shaft 50 in a state in which a predetermined gap G is maintained between the medium M that is transported in the front direction Y on the support table 17 and the liquid ejecting head 31.

In the moving body support apparatus 20 of the embodiment described above, the shaft line J1 of the main shaft 40 is one straight line and the shaft line J2 of the sub-shaft 50 is a plurality of straight lines or a curved line. However, they are not limited to this. For example, the shaft line J2 of the sub-shaft 50 may be one straight line and the shaft line J1 of the main shaft 40 may be a curved line. This modified example will be described with reference to the drawings.

As shown in FIG. 13, in the present modified example, the shaft line J2 of the sub-shaft 50 is one straight line, and the sub-shaft 50 is fixed to each of the holding plates 25a, 25b, and 25c with the holding member 51 in between. On the other hand, the shaft line J1 of the main shaft 40, where the left shaft end portion of the main shaft 40 is fixed to the shaft fixing plate 41 attached to the main frame 21a and the right shaft end portion of the main shaft 40 is fixed to the sub frame 21b, is a curved line projecting in the upper direction +Z, which forms a circular arc shape with curvature radius R. In other words, both the shaft line J1 and the shaft line J2 extend along the left-right direction X when viewed in the upper-lower direction Z. On the other hand, when viewed from the front direction Y, the shaft line J1 extends so as to form a curved line projecting in the upper direction +Z.

Therefore, when the extending direction of the shaft line J1 of the main shaft 40 is defined as a first direction, and the extending direction of the shaft line J2 of the sub-shaft 50 is defined as a second direction, the second direction is a direction in which the distance D from the shaft line J1 of the main shaft 40 to the shaft line J2 of the sub-shaft 50 relatively changes along the along the first direction in the moving range of the carriage 30 that moves along the main shaft 40. Of course, the distance D in this case is a length along a direction perpendicular to the shaft line J2.

The configuration of the modified example shown in FIG. 13 is preferable to be employed when moving the carriage 30 while maintaining the gap G between the liquid ejecting head 31 and a printing surface constant for the medium M whose printing surface is curved.

In the moving body support apparatus 20 of the embodiment described above or the modified examples described above, the second direction in which the shaft line J2 of the sub-shaft 50 extends need not necessarily be a direction in which the distance D from the shaft line J1 of the main shaft 40 to the shaft line J2 of the sub-shaft 50 continuously increases or continuously decreases along the first direction in the moving range of the carriage 30.

For example, although description with reference to the drawings will be omitted here, the shaft line J2 of the sub-shaft 50 is one straight line when viewed in the upper-lower direction Z and may have a shape representing a so-called zigzag shape in which the shaft line J2 includes a plurality of straight lines where a straight line along the left-right direction X and a straight line along the upper-lower direction Z alternately and repeatedly appear when viewed from the front direction Y. The second direction in which the shaft line J2 of the sub-shaft 50 having such a shape extends is a direction in which the distance D from the shaft line J1 of the main shaft 40 to the shaft line J2 of the sub-shaft 50 discontinuously increases or discontinuously decreases along the first direction in the moving range of the carriage 30.

In the moving body support apparatus 20 of the embodiment described above or the modified examples described above, the contact surface 35S of the carriage 30 (the pad 35) is not necessarily a flat surface (inclined surface) but may be a cylindrical surface (curved surface) with an axis line extending in the left-right direction X. Of course, in this case, the sub-shaft 50 is included in the moving body support apparatus 20 so that the shaft line J2 of the sub-shaft 50 exists within a surface away from the cylindrical surface (curved surface) of the contact surface 35S by a radius of the sub-shaft 50 in the normal direction of the cylindrical surface, that is, exists within a cylindrical surface (curved surface) in parallel with the contact surface 35S.

In the moving body support apparatus 20 of the embodiment described above or the modified examples described above, the number of spacers 55 that are sandwiched when the sub-shaft 50 is fixed to the holding plates 25a, 25b, and 25c may be changed arbitrarily. For example, in the moving body support apparatus 20 of the above embodiment shown in FIG. 4, the sub-shaft 50 may be fixed to the holding plate 25b by the fixing screw 26 with two spacers 55 in between and may be fixed to the holding plate 25c by the fixing screw 26 with one spacer 55 in between.

In the moving body support apparatus 20 of the embodiment described above or the modified examples described above, the sub-shaft 50 need not necessarily be a round bar (or a round pipe) having a circular cross section. For example, the sub-shaft 50 may be a polygonal bar (or a polygonal pipe) whose cross section has a polygonal shape such as, for example, an octagonal shape and a hexagonal shape. Of course, in the same manner, the main shaft 40 may be a polygonal bar (or a polygonal pipe) whose cross section has a polygonal shape such as, for example, an octagonal shape and a hexagonal shape, instead of a round bar (or a round pipe).

The printing apparatus 11 of the embodiment described above may be, for example, a large format printer that performs printing on a medium M which is a long paper sheet. In this case, the printing apparatus 11 may unwind the paper sheet from a rolled paper sheet and transport the paper sheet onto the support table 17.

Although the printing apparatus 11 of the embodiment described above ejects four colors of liquids, the printing apparatus 11 may eject single color liquid or may eject two colors, three colors, or five or more colors of liquids.

As the medium M, the printing apparatus 11 of the embodiment described above can use various media such as a plant material paper, a film made of resin, a metallic foil, a metallic film, a composite film (laminate film) made of resin and metal, a fabric, a non-woven fabric, and a ceramic sheet.

The printing apparatus 11 of the embodiment described above may be a liquid ejecting apparatus that ejects and discharges liquid other than ink. A shape of the liquid that is ejected as a minute droplet from the liquid ejecting apparatus may be a granular shape, a tear-drop shape, and a shape that leaves a tail like a string. The liquid mentioned here may be any kind of material that can be ejected from the liquid ejecting apparatus. For example, the liquid may be any material that is in a liquid phase, and examples thereof include fluids such as a liquid body having a high or low viscosity, a sol, gel water, another inorganic solvent, an organic solvent, a solution, a liquid resin, and a liquid metal (metal melt). Furthermore, the examples include not only liquid, as one state of materials, but also materials in which solvent contains dissolved, dispersed, or mixed particles of a functional material made of a solid, such as pigments or metal particles. Representative examples of the liquid include ink such as that described in the foregoing embodiment, liquid crystal, or the like. Here, "ink" encompasses general water-based ink and oil-based ink, as well as various types of liquid compositions such as gel ink and hot melt-ink.

This application claims priority under 35 U.S.C. § 119 to Japanese Patent Application No. 2016-254247, filed Dec. 27, 2016. The entire disclosure of Japanese Patent Application No. 2016-254247 is hereby incorporated herein by reference.

What is claimed is:

1. A moving body support apparatus comprising:
    a main shaft;
    a sub-shaft that is arranged to be spaced from the main shaft; and
    a moving body that moves along the main shaft while causing a contact surface to be in contact with the sub-shaft,
    wherein a distance between the main shaft and the sub-shaft in a direction of gravity changes along a moving direction of the moving body,
    an area of the contact surface in contact with the sub-shaft changes between a first position and a second position in the direction of gravity as the moving body moves, and
    an abrasion area of the moving body in the first position and an abrasion area of the moving body in the second position are different from each other.

2. The moving body support apparatus according to claim 1, wherein the distance between the main shaft and the sub-shaft continuously increases and/or continuously decreases along the moving direction.

3. The moving body support apparatus according to claim 2, wherein the distance between the main shaft and the sub-shaft changes at a constant rate along the moving direction.

4. A printing apparatus comprising:
the moving body support apparatus according to claim 3, and
a printing unit that is included in the moving body and performs printing on a medium by ejecting liquid to the medium.

5. A printing apparatus comprising:
the moving body support apparatus according to claim 2, and
a printing unit that is included in the moving body and performs printing on a medium by ejecting liquid to the medium.

6. The moving body support apparatus according to claim 1, wherein
the moving body has a longest moving range and a shortest moving range in the moving direction, and
the distance between the main shaft and the sub-shaft becomes maximum or minimum in the shortest moving range of the moving body.

7. A printing apparatus comprising:
the moving body support apparatus according to claim 6, and
a printing unit that is included in the moving body and performs printing on a medium by ejecting liquid to the medium.

8. The moving body support apparatus according to claim 1, wherein in a forward movement and a backward movement of the moving body, the distance between the main shaft and the sub-shaft changes in the same manner along the moving direction.

9. A printing apparatus comprising:
the moving body support apparatus according to claim 8, and
a printing unit that is included in the moving body and performs printing on a medium by ejecting liquid to the medium.

10. The moving body support apparatus according to claim 1, wherein the sub-shaft is provided so that the sub-shaft can move while maintaining a state in which a shaft line of the sub-shaft is in parallel with the contact surface of the moving body.

11. A printing apparatus comprising:
the moving body support apparatus according to claim 10, and
a printing unit that is included in the moving body and performs printing on a medium by ejecting liquid to the medium.

12. A printing apparatus comprising:
the moving body support apparatus according to claim 1, and
a printing unit that is included in the moving body and performs printing on a medium by ejecting liquid to the medium.

* * * * *